US007413716B2

(12) United States Patent
Mavinahally et al.

(10) Patent No.: US 7,413,716 B2
(45) Date of Patent: Aug. 19, 2008

(54) MUFFLER WITH CATALYTIC CONVERTER

(75) Inventors: Nagesh S. Mavinahally, Anderson, SC (US); Fabio T. Romero, Simpsonville, SC (US); David R. Brower, Townville, SC (US)

(73) Assignee: Homelite Technologies, Ltd., Hamilton (BM)

( * ) Notice: Subject to any disclaimer, the term of this patent is extended or adjusted under 35 U.S.C. 154(b) by 497 days.

(21) Appl. No.: 11/101,923

(22) Filed: Apr. 8, 2005

(65) Prior Publication Data

US 2006/0225951 A1 Oct. 12, 2006

(51) Int. Cl.
*B01D 50/00* (2006.01)

(52) U.S. Cl. ....................................... 422/177; 422/180

(58) Field of Classification Search ................. 422/177, 422/180; 181/230, 231, 264; 60/299, 302, 60/308
See application file for complete search history.

(56) References Cited

U.S. PATENT DOCUMENTS

| | | | | |
|---|---|---|---|---|
| 4,867,270 | A | 9/1989 | Wissmann et al. | |
| 5,043,147 | A | 8/1991 | Knight | |
| 5,139,107 | A | 8/1992 | Nagai | |
| 5,338,903 | A | 8/1994 | Winberg | |
| 5,426,269 | A | 6/1995 | Wagner et al. | |
| 5,440,083 | A | 8/1995 | Masuda | |
| 5,521,339 | A | 5/1996 | Despain et al. | |
| 5,548,955 | A | 8/1996 | Sandefur et al. | |
| 5,651,249 | A | 7/1997 | Nagao et al. | |
| 5,730,946 | A | 3/1998 | Linnarsson | |
| 5,732,555 | A | 3/1998 | Gracyalny et al. | |
| 5,736,690 | A | 4/1998 | Karlsson | |
| 5,738,184 | A | 4/1998 | Masuda et al. | |
| 5,857,327 | A * | 1/1999 | Sato et al. | 60/302 |
| 5,866,859 | A | 2/1999 | Karlsson et al. | |
| 6,109,026 | A | 8/2000 | Karlsson et al. | |
| 6,164,066 | A | 12/2000 | Sakaguchi et al. | |
| 6,250,075 | B1 | 6/2001 | Funakoshi et al. | |
| 6,315,076 | B1 | 11/2001 | Brück et al. | |
| 6,341,662 | B1 | 1/2002 | Karlsson | |
| 6,393,835 | B1 | 5/2002 | Stoll et al. | |
| 6,622,482 | B2 | 9/2003 | Knight et al. | |
| 2003/0173148 | A1 | 9/2003 | Andersson et al. | |

* cited by examiner

*Primary Examiner*—Glenn Caldarola
*Assistant Examiner*—Tom Duong
(74) *Attorney, Agent, or Firm*—Brinks Hofer Gilson & Lione

(57) ABSTRACT

A muffler with a housing for receiving exhaust gasses from an engine is disclosed. The muffler includes a housing with an inlet and an exit, a baffle plate partitioning the housing into first and second chambers. The baffle plate includes a catalyst receptacle in the first chamber, the second chamber includes the exit of the housing. A catalytic converter element with a longitudinal axis is housed within the catalyst receptacle, the catalytic converter element is positioned within the catalyst receptacle such that exhaust gas passes through the catalytic converter element in a direction transverse to the longitudinal axis of the catalytic converter element and through the second chamber to exit the housing.

6 Claims, 5 Drawing Sheets

MUFFLER WITH CATALYTIC CONVERTER

FIELD OF THE INVENTION

The present invention relates to mufflers for use with combustion engines. More particularly, the present invention relates to mufflers containing a catalytic converter.

BACKGROUND

Small gasoline-powered internal combustion engines, especially two-cycle engines, have a known problem of relatively high emissions of harmful combustion products, such as hydrocarbons, nitrogen oxide, and carbon monoxide. These gasses have been found to cause environmental problems. In an effort to reduce the amount of harmful exhaust gasses released from an engine, many small internal combustion engines are equipped with catalytic converter elements.

While many small internal combustion engines have included catalytic converter elements, many of the old designs have drawbacks. For example, U.S. Pat. No. 5,736,690 entitled "Muffler With Catalytic Converter" discloses a complicated design to form a muffler having an internal catalytic element. Because the muffler has a structurally complicated design, the muffler would be expensive to produce, thereby increasing the cost of the product using the combustion engine.

U.S. Pat. No. 6,164,066 entitled "Muffler For Internal Combustion Engine" features a muffler that contains, an internal catalytic element and a venturi at the outlet of the muffler. Similar to the design of U.S. Pat. No. 5,736,690, this patent describes a muffler that has many complex parts that form numerous distinct chambers inside the muffler as well as a complex structure to hold a catalytic element within the body of the muffler. The process to manufacture the components of this muffler will be time-consuming and the complexity of the muffler will increase the cost of the final product using the muffler.

BRIEF SUMMARY

The muffler includes a housing having an inlet and an exit. A baffle plate within the housing partitions the housing into a first chamber and a second chamber. The baffle plate includes a catalyst receptacle in the first chamber. The second chamber includes the exit of the housing. A catalytic converter element is within the catalyst receptacle and includes a longitudinal axis. The catalytic converter element is positioned so that exhaust gas may pass through the catalytic element in a direction transverse to the longitudinal axis and into the second chamber and through the exit.

A second aspect of the muffler includes a housing attached to an engine with an inlet and an outlet. A nozzle having an inlet section, a venturi tube, and an outlet section is attached to the housing to receive exhaust gas from the housing. The exhaust flowing from the housing into the inlet section passes though a catalytic converter element in a direction transverse to a longitudinal axis of the catalytic element. A cooling gas flows through the nozzle in addition to the exhaust flow. Both the cooling gas and the exhaust gas pass through the venturi tube and out the housing outlet.

A third aspect of the muffler includes a housing attached to an engine to receive exhaust gasses from the engine. The housing includes a catalytic receptacle with at least one opening attached to the interior surface of the housing and a catalytic converter element with a longitudinal axis within the receptacle. The catalytic converter element is position so that exhaust gas may pass though the element in a direction transverse to the longitudinal axis of the element.

A method for purifying exhaust gas passing from an engine into a muffler is also disclosed. The muffler includes a housing with an inlet and an exit, a baffle plate with a catalyst receptacle partitioning the muffler into a first and a second chamber with a catalytic converter element within the catalyst receptacle. The method may include expelling exhaust gas from the engine into the first chamber of the muffler, passing exhaust gas through the catalytic element in a direction substantially transverse to a longitudinal axis of the catalytic element and into the second chamber, and expelling exhaust gas through the exit into the ambient.

A second method for purifying exhaust gas passing from an engine into a muffler is also disclosed. The muffler includes a housing with an inlet and exit, a nozzle with an inlet, a venturi tube and an outlet positioned within the housing. The method may include passing an exhaust gas from the housing through at least one opening in the nozzle, passing the exhaust gas through a catalytic converter element in the nozzle, simultaneously passing a cooling gas through the nozzle and the venturi tube, and passing the exhaust gas and cooling gas mixture through the nozzle outlet to exit the muffler.

Advantages of the present disclosure will become more apparent to those skilled in the art from the following description of the preferred embodiments of the invention that have been shown and described by way of illustration. As will be realized, the design is capable of other and different embodiments, and its details are capable of modification in various respects. Accordingly, the drawings and description are to be regarded as illustrative in nature and not as restrictive.

DETAILED DESCRIPTION OF THE DRAWINGS AND THE PREFERRED EMBODIMENTS

Figure 1:
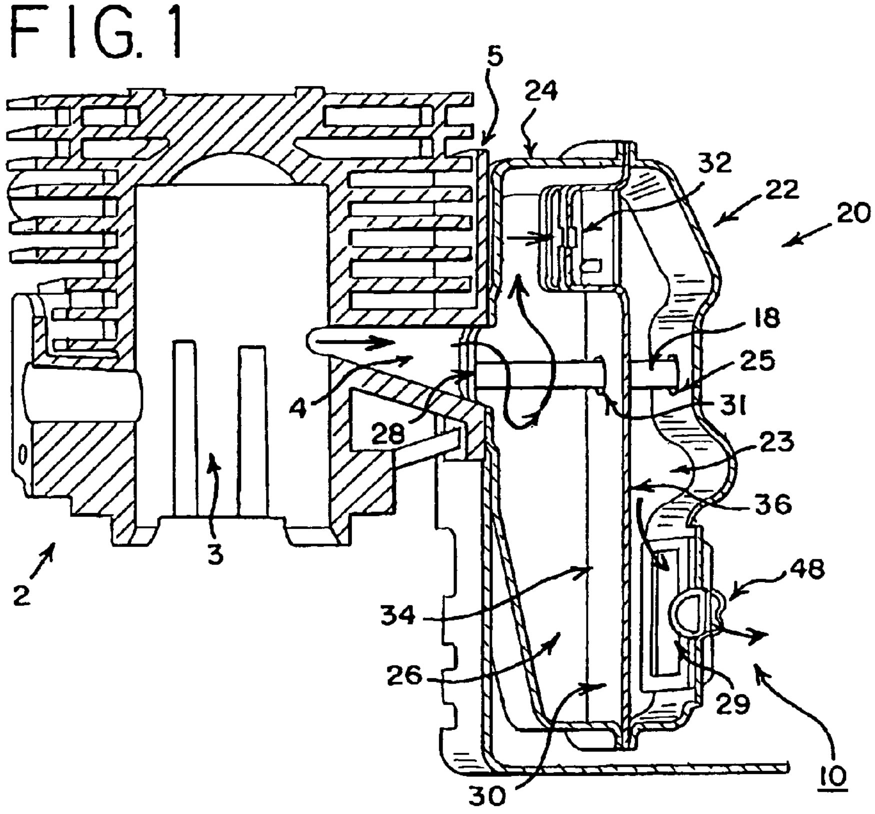
FIG. 1 is a cutaway view of a muffler attached to an engine.

With reference to FIG. 1, a catalytic muffler 10 attached to an internal combustion engine 2 is provided. As will be described further below, the muffler 10 reduces the amount of pollutants produced by the engine 2 that enter the atmosphere. The catalytic muffler 10 features a housing 20 formed of two pieces, the inner cover 24 and the outer cover 22. In a preferred embodiment the inner and outer covers 24, 22 preferably are formed from steel, although other materials are also acceptable. The inner cover 24 features an inner port 28 that is connected to an output orifice 4 of a piston-cylinder 3 to allow exhaust from the piston-cylinder 3 to flow into the housing 20. The inner port 28 of the housing 20 is in fluid communication with an output orifice 4 of the piston-cylinder 3. Exhaust expelled from the piston-cylinder 3 flows out of the output orifice 4 and into the inner port 28 of the housing 20. The inner port 28 of the housing 20 and the output orifice 4 of the piston-cylinder 3 are each sized so that exhaust gasses produced by the engine 2 flow into the housing 20 without creating a significant pressure drop between the piston-cylinder 3 and the housing 20.

The housing 20 includes an inlet chamber (first chamber) 26 and an exit chamber (second chamber) 23, which are separated by a baffle plate 30. Preferably, the baffle plate 30 is formed of the same material as is used to form the inner and outer housings 24, 22 of the housing 20, although in other embodiments the materials forming the housings 24, 22 may be different from each other. The baffle plate 30 preferably is formed from a die-pressed flat plate and includes a catalyst receptacle 32. An inner surface 34 of the baffle plate 30 faces the inlet chamber 26 and an outer surface 36 faces the exit chamber 23. As described further below, the baffle plate 30, with the exception of the catalyst receptacle 32, minimizes communication between the inlet and exit chambers 26, 23.

The baffle plate 30 is sized to extend across the housing 20 to be rigidly connected to the inner and outer covers 24, 22 in the same locations where the inner and outer covers 24, 22 meet. The baffle plate may have tabs (not shown) that protrude from the edges of the baffle plate 30 to allow for attachment to the inner and outer covers 24, 22 at discrete locations, or may be dimensioned such that the entire periphery the of the baffle plate 30 extends outside of the inner and outer housing 22, 24 to allow for attachment. Additionally, a gasket (not shown) may be used to obtain an effective seal between the baffle plate 30 and the housing pieces 24, 22.

It is desirable that the baffle plate 30 have a thickness such that the plate 30 will not deform or deflect due to rapid changes of pressure and temperature within the inlet chamber 26.

The muffler 10 is attached to the engine 2 using a plurality of fasteners 18. The engine 2 and the muffler 10 are aligned so that the muffler 10 may receive exhaust gas from the engine 2. The fasteners 18 maintain a rigid connection between the muffler 10 and the engine 2.

Figure 9:
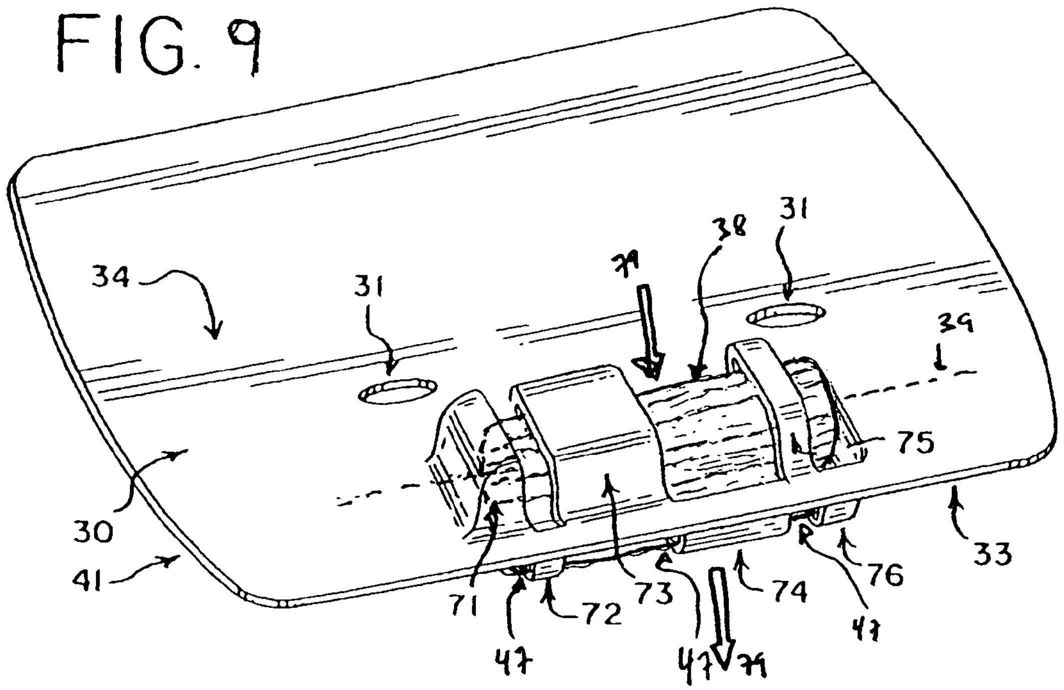
FIG. 9 is a perspective view of a baffle plate having a catalytic converter element within a catalytic receptacle.

The baffle plate 30 is formed to include a receptacle 32 to hold and stabilize a catalytic converter 38. The catalytic converter 38 is formed such that it contains a longitudinal axis 39 (FIG. 9).

Figure 2:
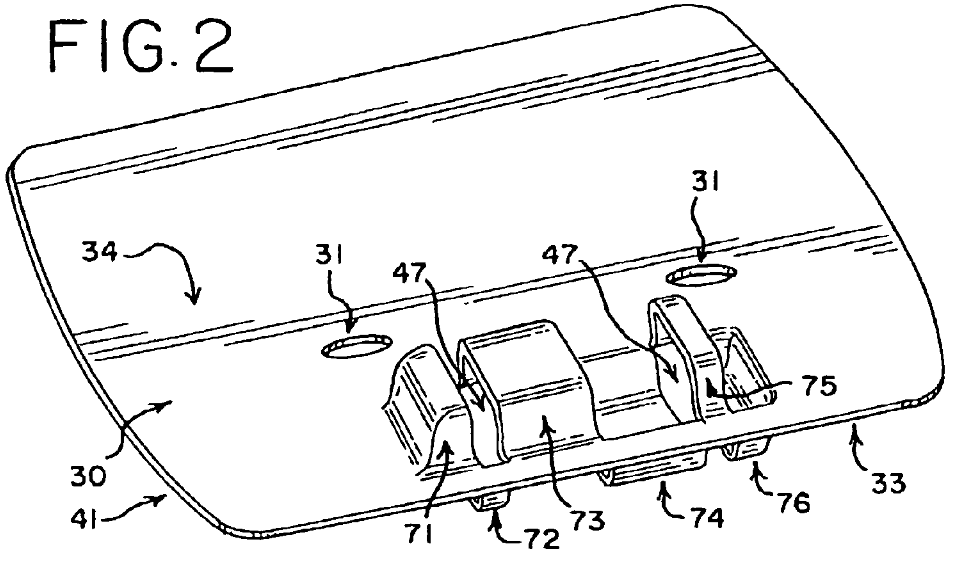
FIG. 2 is a perspective view of one embodiment of a baffle plate.
Figure 5:
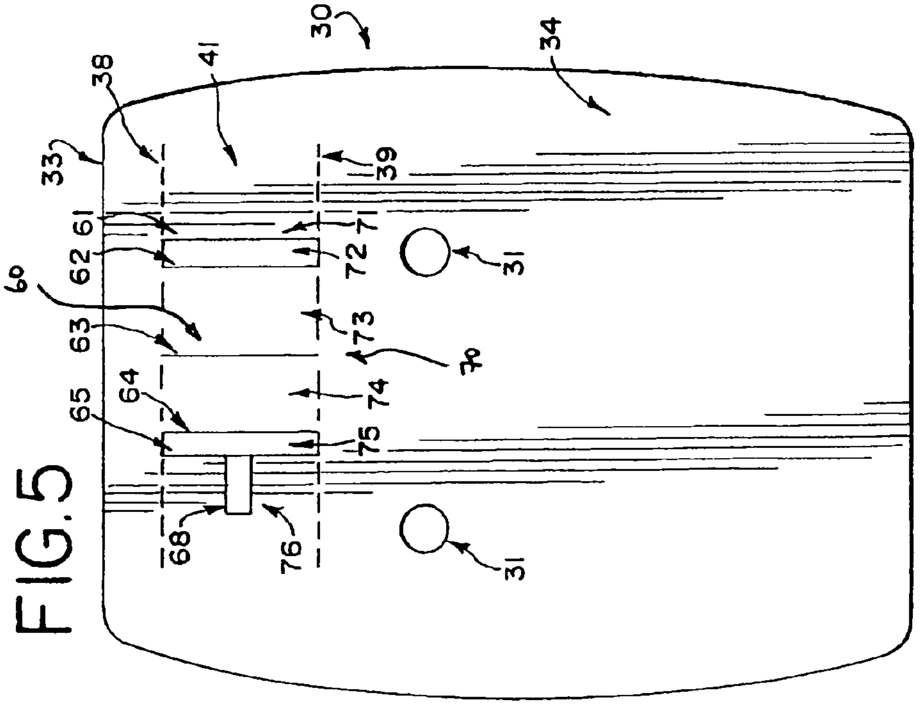
FIG. 5 is a top view of a baffle plate.
Figure 7:
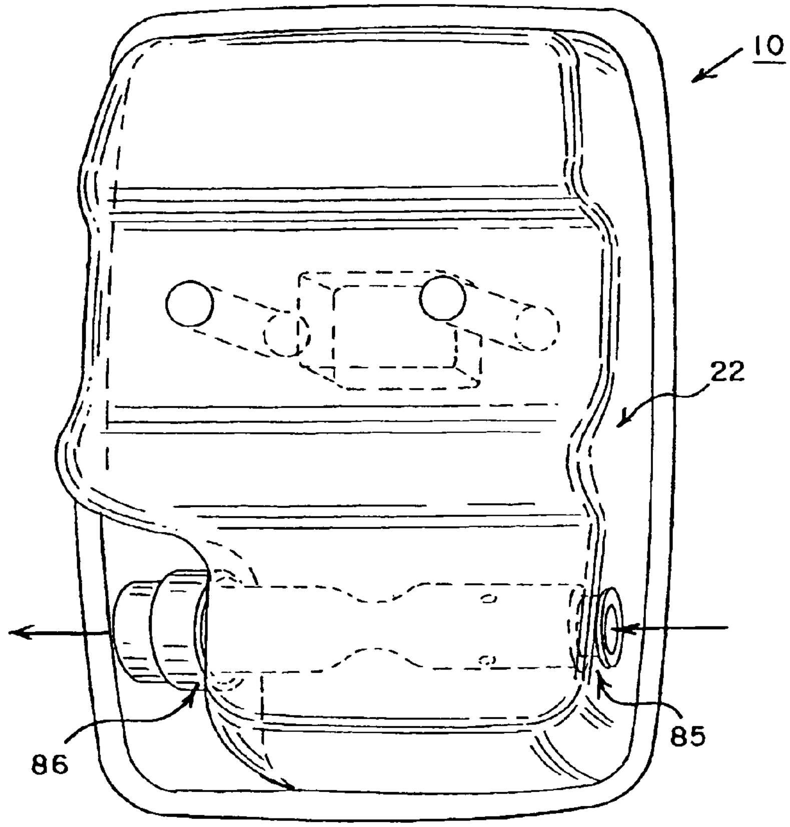
FIG. 7 is a perspective view of the muffler of FIG. 6.

Referring to FIG. 2, the catalyst receptacle 32 is stamped or manufactured in another method as is known in the art to form a plurality of "C" shaped protrusions 70 that protrude from both surfaces 34, 36 of the baffle plate 30. In order to form the protrusions 70, a plurality of slots 60 are cut into the baffle plate 30. The orientation of these slots 60 can be best viewed in FIG. 5. In a preferred embodiment, the slots are formed in an upper portion 41 of the baffle plate 30. For ease of manufacturing, the slots 60 may be parallel to each other, of equal length and positioned at the same distance from the top edge 33 of the baffle plate 30. Alternatively, the slots 60 may be positioned at staggered distances from each other, and in a preferred embodiment a middle slot 63 is spaced further from its two neighboring slots 62, 64 than the other slots are spaced from each other. Cutting the slots in this fashion forms the dimensions of the central located protrusions 73, 74 and two narrow protrusions 72, 75 on the ends of the array of slots. The protrusions 70 may be formed by a die press or other suitable method known to those in the art.

The protrusions 70 are each pressed to form a "C" extending outwardly from the inner and outer surfaces 34, 36 of the baffle plate 30. As shown in FIG. 2, the protrusions may be formed such that two of the protrusions 73, 75 extend from the inner surface 34 and other protrusions 72, 74 extend from outer surface 36. The surface from which the protrusions extend alternate, such that neighboring protrusions extend in opposite directions. The protrusions 70 retain the catalytic converter 38 so that exhaust gas will pass through the catalytic converter 38 in a direction transverse to the longitudinal axis 39 of the catalytic converter 38, as shown by the arrow 79.

Figure 3:
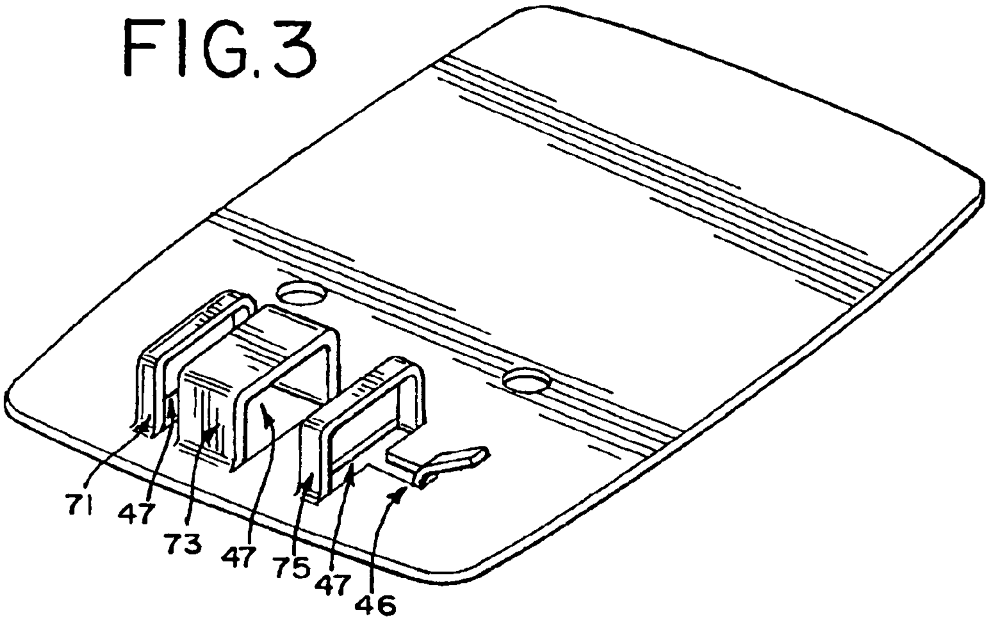
FIG. 3 is a perspective view of a second embodiment of a baffle plate.
Figure 4:
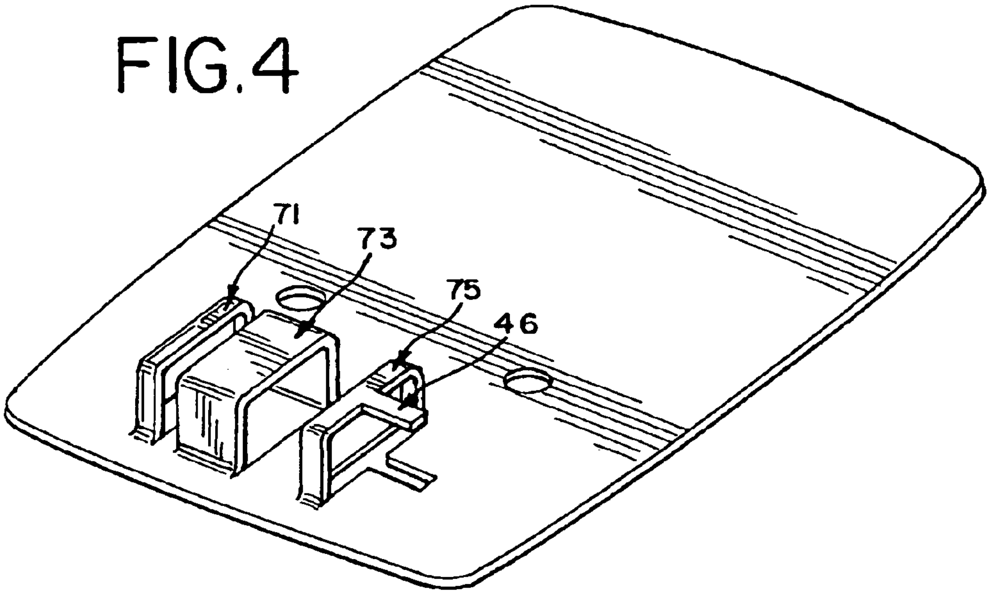
FIG. 4 is a perspective view of a third embodiment of a baffle plate.

In other embodiments, the protrusions 70 may be formed in other patterns. In one exemplary embodiment shown in FIG. 3, a narrow protrusion 75, a wide section 73 that is not adjacent to the narrow protrusion 75, and an outside section 71, are each formed to extend from the inner surface 34 of the baffle plate 30. In addition to the slots 60, a notch 46 is formed in the baffle plate 30 by cutting a "T-shaped" slot 68. As shown in FIGS. 3 and 4, the notch 46 may have different shapes and orientations. The slot 68 may be formed so that the notch 46 will be formed on the protrusion 75 (FIG. 4), or may be formed so that the notch 46 will be perpendicular to the protrusion 75 but extend from the inner surface 34 of the baffle plate (FIG. 3).

The catalytic converter 38 is formed of a weft, or similar roll of material interspersed within a catalytic element. The catalytic element may be a prismatic oxidation catalyst, or other catalytic elements known in the art that will remove pollutants from the exhaust gas. The catalytic element may be formed from either two-way or three-way type. The catalytic element is typically deposited on wire mesh. Alternatively, the catalytic element may be spread on a corrugated sheet that is rolled into cylindrical form. In the nozzle design disclosed below, the catalyst element may be either in mesh or rolled sheet form. Typically, the catalytic converter 38 may be rolled prior to insertion into the catalyst receptacle 32, in a fashion that allows exhaust gas flow through the catalytic converter 38. Once exhaust gas has passed from the engine 2 and into the inlet chamber 26, the exhaust gas will pass through the catalytic converter 38. As noted above, the catalytic converter 38 is positioned within the catalyst receptacle 32 such that exhaust flows transversely to the longitudinal axis 39 of the catalytic converter 38 and into the exit chamber 23, as is shown in FIGS. 1 and 9.

Once exhaust gas passes through the catalyst receptacle 32, it will flow into the exit chamber 23. A flow path is created between the catalyst receptacle 32 and the exit chamber 23 though apertures 47 that are formed by the protrusions 70. This flow path allows exhaust gas to pass through the catalytic converter 38 and into the exit chamber 23 such that a pressure differential is not created between the inlet and exit chambers 26, 23.

After the exhaust gas enters the exit chamber 23 it leaves the muffler 10 through the exhaust port 29 located on the outer cover 22. Optionally, a flash arrestor 48 may be attached to the outer cover 22 to surround the exhaust port 29. The flash arrestor 48 prevents flames or sparks from exiting the housing 20 and is preferably made from a stainless steel mesh or other materials known in the art. The flash arrestor 48 can be welded to the outer cover 22 or attached using another method that is known in the art, such as through the use of a fastener or adhesives.

Figure 6:
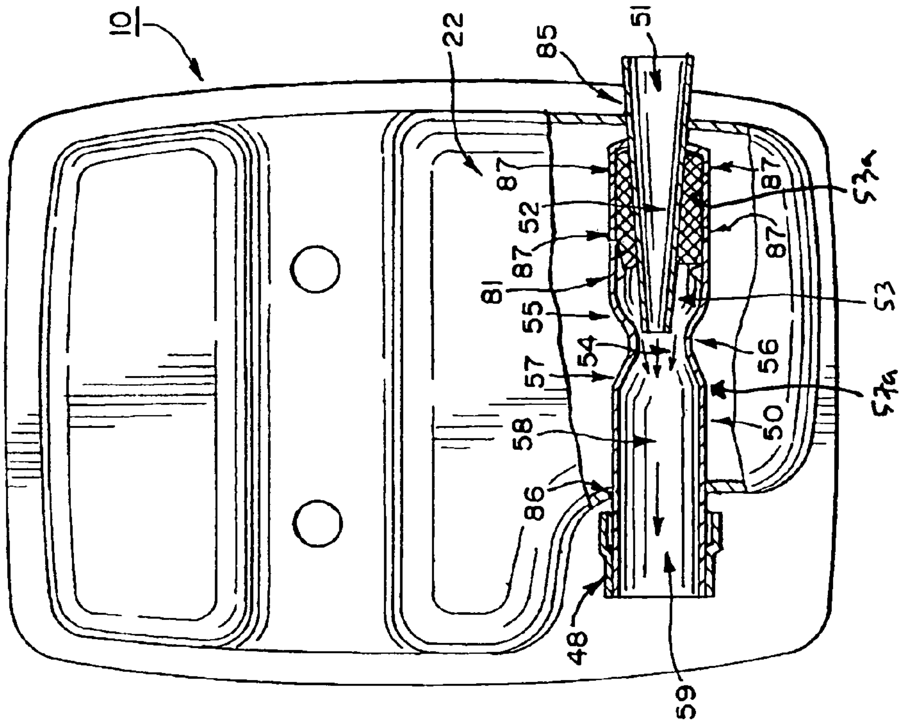
FIG. 6 is a cutaway view of a muffler that includes a nozzle.

In an alternate embodiment, shown in FIG. 6 (with like components being labeled the same), exhaust gas may be released to ambient through a nozzle 50. The muffler 10 contains a housing 20, the inner and outer covers 24, 22 define a volume of the housing.

The nozzle 50 includes a body 81 and two opposing ends 51, 59. The nozzle 50 may be attached to the outer cover 22 with brackets (not shown) or may be welded to the outer cover 22. The nozzle body 81 is located within the housing 20, and the ends 51, 59 open to the ambient through holes 85, 86 formed in the outer cover 22. The holes 85, 86 are sized with respect to the nozzle 50 such that exhaust air is substantially prevented from exiting the exit chamber 22 through the holes 85, 86. Additionally, the ends 51,59 are press fitted or welded to the housing 20.

Figure 8:
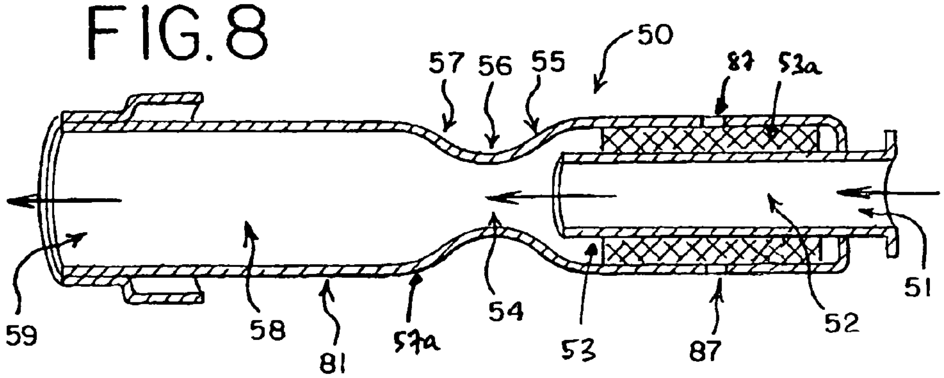
FIG. 8 is a cutaway view of a second embodiment of a nozzle.

The nozzle 50 has three sections: an inlet section 52, a venturi tube 54, and an outlet section 58. The inlet section 52 includes an ambient tube 51, which forms an aperture for a cooling gas, typically ambient air, to enter the nozzle, and an catalytic element chamber 53. The nozzle body 81 contains a plurality of holes 87 that allow for fluid communication from the exit chamber 23 into the catalytic element chamber 53. The holes 87 are located in the section of the nozzle 50 that surrounds the inlet section 52. Additionally, the catalytic element chamber 53 contains sheets of catalytic element 53*a*. The sheets of catalytic element 53*a* consists of the same active catalytic element was described above, but instead of being oriented in a roll, the catalytic element 53*a* fills the catalytic element chamber 53 by being wrapped around the wall forming the ambient tube 51. As shown in FIG. 6, the ambient tube 51 may be formed of a converging pipe that has a cross-sectional area that converges along the length of the inlet section 52, or as is shown in FIG. 8, the ambient tube 51 may feature a non-converging pipe, or a pipe of consistent cross-sectional area, along the length of the inlet section 52.

The nozzle 50 features a venturi tube 54 located downstream of the inlet section 52. The venturi tube 54 features three subsections, a converging section 55, a throat 56, and a diverging section 57. The converging section 55 features a pipe with a cross-sectional area that decreases along the length of the section. Both the catalytic element chamber 53 and the ambient tube 51 flow into the converging section 55 of the venturi tube 54. The throat 56 is the point in the venturi tube 54 where the cross-sectional area is at the minimum, and the diverging section 57 is the length of pipe in the venturi tube 54 where the cross-sectional area increases along the length of the section.

The final section along the length of the nozzle 50 is the outlet section 58. Preferably, the outlet section 58 is a pipe, having a substantially constant cross-sectional area and is of substantially the same diameter as the diameter at the output 57*a* of the diverging section 57 of the venturi tube 54. An end of the outlet section 58 includes the outlet port 59 that extends through the hole 86 provided in the outer housing 22.

The nozzle 50 includes two different flow paths. Similar to the flow path for the embodiments including the baffle plate 30, the muffler 10 is connected to the engine 2 and receives exhaust gas in the housing 20. The exhaust gas leaves the engine 2 and enters the housing 20 though the inner port 28. The exhaust gas accumulates within the housing 20 and flows through the plurality of holes 87 and into the catalytic element chamber 53. Upon entering the catalytic element chamber 53 the exhaust flows through the catalytic element 53*a*, which will remove the harmful impurities from the exhaust.

After entering the catalytic element chamber 53 and passing through the catalytic element 53*a* the exhaust enters the venturi tube 54. When the exhaust gas enters the venturi tube 54 it will initially flow through the converging section 55, which as discussed above, has decreasing cross-sectional area as the exhaust continues to flow down the venturi tube. At steady state the mass flow rate of the exhaust entering the nozzle 50 from the housing 20 is constant. Therefore the flow velocity of the gas increases through the converging section 55 to make up for the decreasing flow area. Additionally, the pressure of the exhaust gas correspondingly decreases as the exhaust gas flows through the converging section 55. The decrease in pressure in the converging section 55 of the venturi tube 54 creates a suction that "pulls" ambient air into the nozzle 50 through the ambient tube 51. The ambient air entering the ambient tube mixes with the hot exhaust gas in the converging section 55 of the venturi 54 and reduces the temperature of the exhaust gas released to ambient through nozzle outlet 59.

After the exhaust gas passes the throat 56 of the venturi tube 54, the cross-sectional area of the flow path increases as the exhaust gas continues to flow. This increase in flow area causes the opposite effects to the velocity and pressure of the mixed exhaust gas and ambient air. After leaving the diverging section 57 of the venturi tube 54, the exhaust gas passes through the outlet section 58 and exits the muffler 10 through the outlet port 59. Optionally, and as described above, the flash arrestor 48 may be attached to the outer housing 22 to cover the outlet port 59.

It is also possible to combine the embodiments featuring the muffler baffle plate and catalyst receptacle with the embodiments featuring the nozzle in forming the muffler that has the advantages of both of the embodiments described above. In this embodiment, the muffler includes the baffle plate between the inner and outer housings. The baffle plate forms a catalyst receptacle as described above, which holds a roll of catalytic element. Exhaust air exiting the muffler travels through the inlet chamber, flows through the catalyst receptacle and the catalytic element removing impurities from the exhaust. The exhaust then enters the exit chamber. Eventually, the exhaust then flows through apertures in the nozzle located around the inlet section and into the catalytic element chamber. After entering the catalytic element chamber, the exhaust flows through additional catalytic element, further removing impurities from the exhaust. The exhaust then flows into the converging section of the venturi tube. The decrease in cross-sectional area in the venturi causes the exhaust flow velocity to increase and the pressure to decrease. This decrease in pressure "pulls" ambient air into the ambient tube of the nozzle and the exhaust mixes with the ambient air in the venturi. The exhaust and ambient mixture exit the venturi and enter the outlet section eventually exiting the nozzle through the outlet port at a lower temperature than normal exhaust due to the exhaust mixing with air at ambient temperature.

The foregoing disclosure is the best mode devised by the inventors. It is apparent, however, that the apparatus may incorporate modifications and variations. Inasmuch as the foregoing disclosure is intended to enable one skilled in the pertinent art to practice the instant invention, it should not be construed to be limiting, but should be construed to include the aforementioned variations and be limited only by the spirit and scope of the following claims.

It is therefore intended that the foregoing detailed description be regarded as illustrative rather than limiting, and that it be understood that it is the following claims, including all equivalents, that are intended to define the spirit and scope of the invention.

We claim:

1. A muffler for use with an engine comprising:

an inner port for receiving exhaust gases from the engine;

a housing attached to the engine, the housing including a housing outlet and a housing inlet;

a nozzle having an inlet section attached to the housing inlet for a cooling gas to enter into the inlet section, a venturi tube, and an outlet section attached to the housing outlet and at least one opening into the housing for fluid communication between the housing and the inlet section;

a catalytic converter element within the nozzle; and wherein exhaust gas passes through the at least one opening and the catalytic converter element in a direction transverse to a longitudinal axis of the catalytic element, and wherein the cooling gas and exhaust gas pass through the venturi tube and through the housing outlet.

2. The muffler of claim 1 wherein the at least one opening into the housing further comprises a plurality of openings into the housing.

3. The muffler of claim 1 wherein the venturi tube further comprises a converging chamber and a diverging chamber and wherein the catalytic converter element is located within the inlet section and the cooling gas and exhaust gas pass through the diverging chamber.

4. The muffler of claim 1 further comprising a flash arrestor attached to the outlet section.

5. The muffler of claim 1 wherein the inlet section further comprises an ambient tube formed of a pipe having a substantially constant cross-section.

6. The muffler of claim 1 wherein the inlet section further comprises an ambient tube formed of a converging pipe.

* * * * *